United States Patent
Williams

(10) Patent No.: US 8,539,770 B2
(45) Date of Patent: Sep. 24, 2013

(54) EXHAUST ARRANGEMENT FOR AN INTERNAL COMBUSTION ENGINE

(75) Inventor: Andrew Morgan Williams, Loughborough (GB)

(73) Assignee: Loughborough University, Leicestershire (GB)

(*) Notice: Subject to any disclaimer, the term of this patent is extended or adjusted under 35 U.S.C. 154(b) by 178 days.

(21) Appl. No.: 13/124,410

(22) PCT Filed: Oct. 16, 2009

(86) PCT No.: PCT/GB2009/051390
§ 371 (c)(1),
(2), (4) Date: Apr. 15, 2011

(87) PCT Pub. No.: WO2010/043910
PCT Pub. Date: Apr. 22, 2010

(65) Prior Publication Data
US 2011/0197582 A1  Aug. 18, 2011

(30) Foreign Application Priority Data

Oct. 17, 2008 (GB) .................................. 0819046.4

(51) Int. Cl.
| F02B 33/00 | (2006.01) |
| F02B 37/00 | (2006.01) |
| F02B 37/007 | (2006.01) |
| F02B 75/02 | (2006.01) |
| F01N 5/04 | (2006.01) |
| F02M 25/07 | (2006.01) |

(52) U.S. Cl.
USPC .............. 60/612; 60/605.2; 60/280; 123/315; 123/316; 701/103

(58) Field of Classification Search
USPC   60/315, 305, 280, 612, 605.2; 123/315–316; 701/103
See application file for complete search history.

(56) References Cited

U.S. PATENT DOCUMENTS 4,413,593 A * 11/1983 Resler, Jr. .................... 60/605.2
4,439,983 A    4/1984 Gertz
(Continued)

FOREIGN PATENT DOCUMENTS

AT     1033 U1     9/1996
DE     4243306     6/1994
(Continued)

OTHER PUBLICATIONS

Moller et al., Divided Exhaust Period—A Gas Exchange System for Turbocharged SI Engines, New SI Engine and Component Design 2005 (SP-1966), 2005 SAE World Congress, Detroit, MI, Apr. 11-14, 2005.

*Primary Examiner* — Thai Ba Trieu
(74) *Attorney, Agent, or Firm* — Endurance Law Group, PLC

(57) ABSTRACT

An internal combustion engine including an exhaust arrangement comprises a first exhaust duct and a second exhaust duct. A valve arrangement preferably comprising separate first and second exhaust valves associated with each cylinder, to selectively direct exhaust from engine to the first exhaust duct during a first exhaust period, and to the second exhaust duct during a subsequent second exhaust period. A turbine having an inlet is connected to the first exhaust duct; and a compressor drivingly connected to and driven by the turbine, has an inlet connected to second duct. The compressor, driven by the turbine extracting energy from the exhaust, reduces the back pressure in the exhaust system reducing pumping losses, with the second duct bypassing the turbine in the second exhaust period such that the turbine also does not increase the exhaust back pressure at least during the main second exhaust phase.

16 Claims, 2 Drawing Sheets

(56) References Cited

U.S. PATENT DOCUMENTS

| | | | |
|---|---|---|---|
| 4,538,574 A * | 9/1985 | Lombardi | 60/612 |
| 4,912,927 A | 4/1990 | Billington | |
| 4,916,903 A * | 4/1990 | Holmer | 123/316 |
| 4,964,375 A * | 10/1990 | Takeyama et al. | 123/315 |
| 5,282,361 A | 2/1994 | Sung | |
| 5,542,249 A | 8/1996 | Heath | |
| 5,791,146 A * | 8/1998 | Dungner | 60/605.2 |
| 5,826,560 A * | 10/1998 | Ito | 123/315 |
| 5,896,744 A | 4/1999 | Lee | |
| 5,941,069 A | 8/1999 | Heath | |
| 6,062,178 A | 5/2000 | Meyers et al. | |
| 6,189,318 B1 | 2/2001 | Valisko | |
| 6,237,335 B1 * | 5/2001 | Lonnqvist | 60/605.2 |
| 6,434,936 B1 | 8/2002 | Singh | |
| 6,595,183 B1 * | 7/2003 | Olofsson | 123/315 |
| 6,883,319 B2 | 4/2005 | Ekenberg | |
| 7,509,805 B2 * | 3/2009 | Karlsson | 60/612 |
| 7,587,898 B2 * | 9/2009 | Turner | 60/612 |
| 7,735,316 B1 | 6/2010 | Toney | |
| 8,000,878 B2 * | 8/2011 | Massardi et al. | 701/103 |
| 8,160,803 B2 * | 4/2012 | Massardi et al. | 701/103 |
| 2005/0022521 A1 | 2/2005 | Patry | |
| 2006/0151238 A1 | 7/2006 | Giordano | |
| 2008/0163615 A1 | 7/2008 | Trimingham | |
| 2009/0031715 A1 | 2/2009 | Fluga et al. | |
| 2009/0223220 A1 | 9/2009 | Vuk | |
| 2009/0241540 A1 | 10/2009 | Robel | |
| 2011/0000471 A1 * | 1/2011 | Anderson et al. | 123/605 |
| 2011/0023765 A1 | 2/2011 | Lehikoinen et al. | |

FOREIGN PATENT DOCUMENTS

| | | |
|---|---|---|
| DE | 4430849 | 3/1996 |
| DE | 4432506 | 3/1996 |
| DE | 29707722 | 10/1998 |
| DE | 19805678 | 11/1998 |
| DE | 102004028482 A1 * | 12/2005 |
| DE | 102006005228 | 8/2007 |
| DE | 102007046658 | 4/2009 |
| EP | 1400667 A2 * | 3/2004 |
| FR | 2703731 | 10/1994 |
| FR | 2870566 | 11/2005 |
| GB | 179926 | 5/1923 |
| GB | 319426 | 9/1929 |
| GB | 2185286 | 7/1987 |
| JP | 01285619 A * | 11/1989 |
| JP | 3179132 | 8/1991 |
| JP | 5187249 | 7/1993 |
| JP | 06280586 A * | 10/1994 |
| JP | 8121181 | 5/1996 |
| JP | 10089106 A * | 4/1998 |
| WO | WO99/01649 | 1/1999 |
| WO | WO01/53665 | 7/2001 |
| WO | WO2009/099399 | 8/2009 |

* cited by examiner

EXHAUST ARRANGEMENT FOR AN
EXHAUST ARRANGEMENT FOR AN INTERNAL COMBUSTION ENGINE

BACKGROUND OF THE INVENTION

1. Field of the Invention

The present invention relates to internal combustion engines, in particular to an exhaust arrangement for a reciprocating or rotary internal combustion engine.

2. Related Art

There is a continuing need to improve the efficiency and fuel economy of modern internal combustion engines. One area of inefficiency relates to the 'breathing' of the engine. During the 'breathing' of the engine the piston does work to draw the fresh air or air-fuel mixture into the cylinder and then expel it after the compression and power strokes. This breathing takes work (known as pumping losses) directly from the output of the engine and, hence, is detrimental to the fuel economy of the engine (more notably on throttled engines). Much effort is being put into operating the engine with minimal pumping losses to improve fuel economy.

To operate more efficiently modern engines may be 'boosted' by an inlet compressor which may be driven by the engine (supercharging) or by an exhaust turbine (turbocharging). This reduces inlet pumping losses and also increases power allowing the engine to be downsized (reduced swept volume). An engine driven compressor however undesirably takes work from the engine. Using a turbine in the exhaust to drive the inlet compressor in a turbocharging system extracts waste energy from the exhaust and avoids taking work from the engine further improving efficiency. More specifically after combustion and the main power stroke, and prior to the exhaust valve opening, cylinder pressures are typically higher than exhaust system pressures. This results in an initial flow of gas out of the cylinder as the exhaust valve is opened, referred to as 'blowdown', which can drive the turbine, although subsequently the piston must do work to expel the remaining exhaust gases against the exhaust system pressure. However with all the exhaust gas flowing through the exhaust turbine there is an increased pressure drop across the turbine during the exhaust stroke. This pressure acts on the piston increasing pumping losses on the exhaust, and so offsetting some of the benefit.

It has been proposed to provide a divided exhaust arrangement to reduce the exhaust pumping losses associated with such turbine arrangements. Such arrangements have been proposed as long ago as 1921 in GB 179926, and more recently in GB 2185286, U.S. Pat. No. 6,883,319, and in a paper titled "Divided Exhaust Period—A Gas Exchange System for Turbocharged SI Engines" by C. E. Möller, P. Johansson, B. Grandin and F. Lindström, (SAE Technical Paper 2005-01-1150, 2005). In such proposals the exhaust is split and a suitable valve arrangement directs the exhaust to the turbine during the first 'blowdown' exhaust period to drive the inlet compressor, and then during a second exhaust period, bypasses the turbine to thereby reduce exhaust back pressure and allowing the exhaust to more easily vent from the engine so reducing exhaust pumping losses. While proving an improvement over conventional turbocharging arrangements, there are still significant exhaust pumping losses associated with the bypass flow, and these may even be increased, as compared to a non turbocharged exhaust, due to the loss of energy and gas inertia from the initial exhaust blowdown used by the turbine.

Another, to some degree opposite proposal to that of turbocharging, is to place a pump or compressor in the exhaust to positively extract the exhaust gases from the engine and thereby reducing any pumping losses and work done by the piston in expelling the exhaust gases, or even in the extreme to provide a positive load on the piston. Examples of such proposals are described in WO 9728360 in which the exhaust pump is driven by the engine, similar to a supercharging arrangement, and in U.S. Pat. No. 4,439,983 in which the exhaust compressor is driven by an inlet turbine driven by the inflow of fresh air or air-fuel mixture into the cylinder, somewhat similarly to a reverse turbocharging arrangement. In both of these proposals however while exhaust pumping losses are reduced, work is either taken from the engine, or the inlet pumping losses are increased.

Accordingly while all of these arrangements reduce pumping losses and/or improve efficiency, these gains are to some degree off set and reduced by other losses. For example in the case of a turbocharger arrangement to increase engine power and improve engine efficiency, there is an increase in exhaust pressure and pumping losses. In the case of an exhaust pump driven by an inlet turbine replacing the conventional throttle there is a loss of engine responsiveness. In a supercharger, or an exhaust pump, that is driven by the engine some engine power is used with associated performance and efficiency loss. These proposals therefore represent compromises, as well as having other problems. Indeed only turbocharging arrangements have been widely adopted.

It is therefore desirable to provide an improved internal combustion engine exhaust arrangement, and indeed internal combustion engine arrangement, which addresses the above described problems and/or which more generally offers improvements or an alternative to existing arrangements. More specifically there is a need for an improved internal combustion engine exhaust arrangement which reduces pumping losses in particular exhaust pumping losses and/or which improves efficiency of exhaust and/or of the engine overall.

SUMMARY OF THE INVENTION

According to the present invention there is therefore provided an exhaust arrangement for an internal combustion engine, and an internal combustion engine including such an exhaust arrangement, as described in the accompanying claims.

In an embodiment of a first aspect of the invention there is provided an exhaust arrangement for an internal combustion engine comprising a first exhaust duct and a second a second exhaust duct for exhaust flows from the engine, and a valve arrangement to selectively direct exhaust from the engine to the first exhaust duct during a first exhaust period, and to the second exhaust duct during a subsequent second exhaust period. The exhaust further includes a turbine having an inlet connected to the first exhaust duct, and a compressor drivingly connected to and driven by the turbine, and having an inlet connected to the second duct.

By this arrangement the turbine extracts energy from the exhaust gas during the first, blowdown, exhaust period, and which is used through rotating inertia of the turbine/compressors to drive the compressor to positively extract the exhaust gases from the cylinders, and reduce the exhaust system back pressure and exhaust pumping losses during the second exhaust period. The turbine is also effectively bypassed during the second exhaust period so that it does not increase the exhaust back pressure and exhaust pumping losses. This it has been found leads to significant reductions in pumping losses, improvements in efficiency and fuel economy gains.

It should in particular be noted that this is based on a different approach to that conventionally used and to that of the prior proposals. All the prior arrangements have the compressor/pump on one side engine, and turbine on other side engine, or are driven by engine itself with attendant losses. This arrangement adopts a different, and to some degree counter approach, with the compressor and the turbine driving the compressor both on the same exhaust side of the engine, and both deriving energy from the exhaust, and supplying energy to extract the gases from the exhaust, albeit in different operative exhaust periods.

In the preferred embodiments the first and second period are timed such that the first period corresponds to when the piston of the engine is close to maximum displacement (i.e. bottom dead center) and where there is little movement and so little work being done by the piston and so contributes little to exhaust pumping losses.

The turbine preferably has an outlet connected to the second exhaust duct and/or compressor inlet.

The valve arrangement preferably selectively directs exhaust from engine to both the second and first exhaust duct during the second exhaust period. Alternatively the valve arrangement may selectively direct exhaust from the engine to only the first exhaust duct during the first exhaust period, and to only the second exhaust duct during the subsequent second exhaust period. Furthermore the valve arrangement preferably comprises separate first and second exhaust valves, and in particular preferably separate first and second exhaust valves associated with each cylinder of the internal combustion engine.

The first exhaust period preferably corresponds to a period when the piston is substantially stationary. The second exhaust period preferably corresponds to a period when the piston is moving during an exhaust stroke.

The exhaust arrangement may further comprise a heat exchanger or cooler connected to at least the second exhaust duct for cooling the exhaust gases flowing, in use, through the second exhaust duct. This reduces the exhaust back pressure further. An outlet of the heat exchanger is preferably connected to the inlet of the compressor.

The exhaust arrangement may yet further comprise a second turbine having an inlet connected to the second exhaust duct and an outlet connected to the compressor inlet, and drivingly connected to an inlet compressor for compressing an inlet flow into the engine.

In an embodiment of a second aspect of the invention there is provided an internal combustion engine including such an above described exhaust arrangement.

The internal combustion engine may further include an inlet compressor for compressing an inlet flow into the engine. The inlet compressor may be drivingly connected to and driven by the turbine. Alternatively, and more preferably the exhaust arrangement further comprises a second turbine having an inlet connected to the second exhaust duct and an outlet connected to the compressor inlet, and drivingly connected to the inlet compressor of the engine.

BRIEF DESCRIPTION OF THE DRAWINGS

The present invention will now be described by way of example only with reference to the following figures in which.

DETAILED DESCRIPTION OF THE PREFERRED EMBODIMENT

Figure 1:
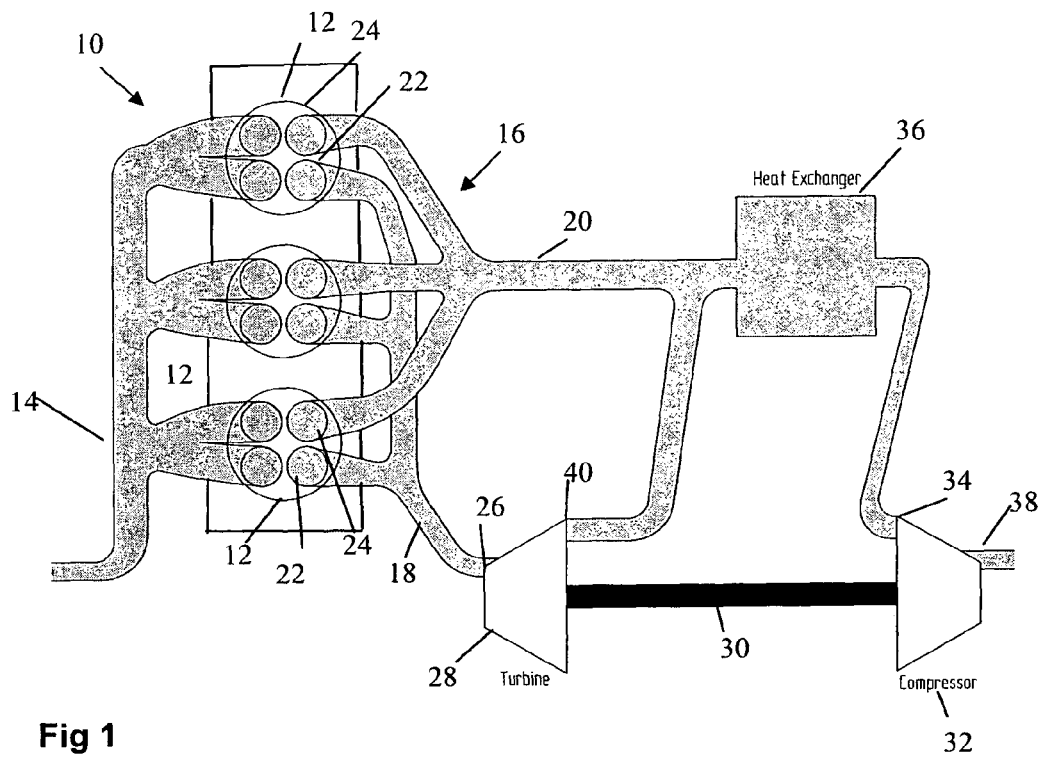
FIG. 1 is a schematic illustration of an exhaust and inlet system applied to a three cylinder internal combustion engine in accordance with an embodiment of the invention.

Referring to FIG. 1 a reciprocating internal combustion engine 10 comprises at least one reciprocating piston (not shown) located within a corresponding cylinder 12 and connected in a conventional manner to rotate a crank shaft (not shown). The movement of the piston within the cylinder 12 defines a swept volume within the cylinder. An inlet arrangement 14 supplies fresh air, a fuel-air mixture or a fuel-air-EGR (exhaust gas recirculation) mixture to each of the cylinders 12 which is then compressed by movement of the piston within the cylinder 12. Combustion then takes place within the cylinder 12 and the expanding gases drive the piston and crank shaft. The combustion gasses are then exhausted from the cylinder 12 and internal combustion engine 10 via an exhaust system 16. The internal combustion engine 10 may have any number of cylinders 12 and corresponding pistons with this particular embodiment the engine 10 having three cylinders 12. The inlet arrangement 14 may comprise a conventional carburetor or fuel injection arrangement or other known inlet arrangement. As is generally stated the engine 10 described so far is conventional and well-known, and the invention is applicable to all types of internal combustion engines including for example, diesel ignition engines, gasoline spark ignition engines, gas engines, HCCI (Homogeneous Charge Compression Ignition) engines, and 2 or 4 stroke engines. The invention may also be applicable to non-reciprocating internal combustion engines, for example rotary engines.

As further shown in FIG. 1 the exhaust system 16 of the embodiment of this invention comprises a divided exhaust arrangement similar to that described in GB 179926, U.S. Pat. No. 6,883,319 and GB 2185286. The exhaust system 16 has a first exhaust duct 18 and second exhaust duct 20 comprising, in this embodiment separate manifolds connected to the respective cylinders 12.

A valve arrangement, in this embodiment comprising at least two separate exhaust valves 22, 24 in each of the cylinders 12 selectively controls the exhaust flow from each of the cylinders 12 into each of the respective manifolds and exhaust ducts 18, 20 as will be described further below. Such an arrangement of twin exhaust valves is similar to that described in GB 179926 and U.S. Pat. No. 6,883,319. Moreover the detail of such exhaust valves 22, 24 in the cylinders 12, and how they generally open and operate is well known. It will also be appreciated that in other embodiments other valve arrangements may be utilized to selectively control the flow of exhaust gases from the cylinders 12 into the respective first and second exhaust ducts 18, 20. For example each cylinder 12 may include a single exhaust valve to control the flow of exhaust gases from the cylinder with there then being a separate selector valve to select the exhaust flow from the first or second 18, 20 exhaust duct, although such an arrangement is more complex and less desirable than as shown and described. It will also be appreciated that there may be more exhaust valves per cylinder and for each duct 18,20. For example there may be one exhaust valve in each cylinder connected to the first duct 18, and delivering exhaust to the turbine, and then two exhaust valves per cylinder connected to the second duct to improve the exhaust during the second exhaust phase. Other arrangements and numbers of valves are also possible.

The first duct 18 is connected to the inlet 26 of a turbine 28 which is drivingly connected via a drive shaft 30 to drive a compressor 32. The second duct 20 is connected to the inlet 34 of the compressor 32, via an optional heat exchanger 36, with the compressor 32 having an outlet 38 to atmosphere. Additional exhaust components such as catalysts and particulate filters may be placed within this exhaust system. The second exhaust duct 20 accordingly provides a means to bypass the turbine 28. The outlet 40 of the turbine is preferably connected to the second duct 20 such that gasses from the turbine 28 flow through the optional heat exchanger 36 if fitted to the inlet 34 of the compressor 32.

The turbine 28 and compressor pump 32 may be any conventional turbine and compressor arrangement suitably optimized for this particular application as known in the art. The compressor 32 while as described in this embodiment as a compressor may in fact comprise a scavenge pump, or indeed any pump arrangement and is principally adapted to extract and suck air from its inlet 34 through the compressor to its outlet 38.

In operation during the exhaust stroke of the respective cylinders 12 the valve arrangement operates during a first exhaust phase or period to vent exhaust gases from the cylinder 12 via the first duct 18, and then subsequently during a second exhaust phase at via the second exhaust duct 20 or both. The valve arrangement may operate exclusively with the exhaust gases being exclusively directed via the first or second ducts 18,20, or may operate in combination with during the first period exhaust gases being vented through the first duct 18, and in the second period the valve arrangement being open to allow the exhaust gases to vent though both ducts. It is preferred to vent and exhaust through both ducts 18,20, to ensure there is still a flow of exhaust though the first duct 18 and turbine 28 during the second exhaust phase, otherwise the turbine 28 will decompress the first duct 18 and the turbine 28 will experience a strong force stopping it (and hence the compressor 32) turning. In the preferred arrangement during the second exhaust phase when the second valve 24 opens, the turbine 28 is bypassed such that the turbine outlet 40 is effectively connected to the turbine inlet 26 and so will be at the same (or very similar) pressure. As such there will be no pressure drop across the turbine 28, and so no energy will be extracted by the turbine 28 to drive it, but also there will be no reverse pressure drop nor load on the turbine 28 to significantly slow it down. The turbine 28 will therefore continue to rotate due to its inertia. It should also be noted that using and supplying exhaust to both ducts 18,20 in the second exhaust phase the exhaust outlet area is increased so further reducing any back pressure.

Figure 2:
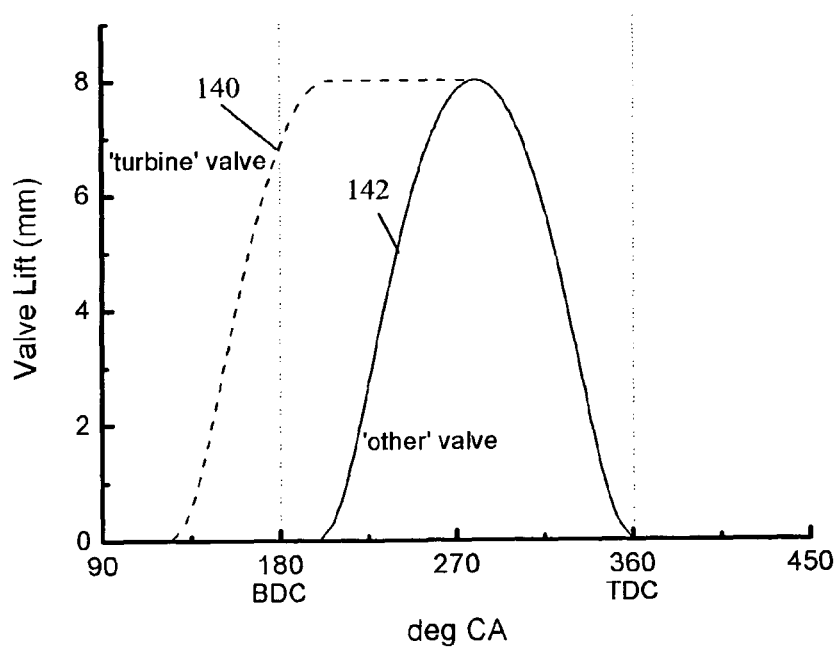
FIG. 2 is a graph showing the timing of the opening of the exhaust valves associated with one of the cylinders of the exhaust system and internal combustion engine shown in FIG. 1.

In this particular embodiment the first valve 22 is configured to open before the second valve 24 of the respective cylinder 12. This is shown in FIG. 2 where the valve lifts and so opening of the first valve 22 is indicated by line 140, and the opening of the second valve 24 is shown by line 142, relative to the nominal crank angle. As a result the initial relatively higher pressure exhaust gas within the cylinder 12 at the beginning of the exhaust stroke is initially vented as a blowdown flow through the first exhaust valve 22 into the first duct 18 in the first exhaust phase. The turbine 28 extracts energy from the initial relatively higher pressure blowdown flow of exhaust gases in the first exhaust phase, and uses it to drive the compressor 32. It should in particular also be noted that this initial blowdown flow and flow of exhaust from the cylinder 12 occurs while the piston is around bottom dead centre (as shown by the timing of the valve opening in FIG. 2). At this point there is relatively small displacement of the reciprocating piston, and so, coupled with the high initial pressure, negligible work is done by the piston (and so engine) to drive this initial exhaust and blowdown flow from the cylinder 12 against any back pressure of the turbine 28. The back pressure provided by the turbine 28 and first exhaust duct 18 therefore has a negligible effect on any reverse load or torque on the piston and engine. Subsequently in the exhaust stroke, and second exhaust phase, and as the piston moves away from bottom dead centre and begins to move more significantly, the second exhaust valve 24 open to allow the exhaust from the cylinder 12 to flow into the second exhaust duct 20 and bypass the turbine 28 providing a less obstructed flow without the back pressure provided by the turbine 28 and at a lower back pressure. As a result the later flow of exhaust gases during the second exhaust phase from the cylinder 12 now flows preferentially into the second duct 20. Therefore as the piston begins to move more significantly the piston is subject to a lower exhaust back pressure provided by the second duct 20 pressure than would be provided to a flow through only the first duct and turbine 28. As a result exhaust pumping losses are reduced.

Furthermore in this embodiment and as described above and shown, the second exhaust duct 20 is connected to the compressor 32. The compressor 32 driven by the turbine 28 and energy advantageously extracted from the blowdown flow in the first exhaust sucks exhaust gases through the second duct 20. The compressor 32 acts to depressurize the exhaust system 16. This lowers the back pressure in the second duct 20, and accordingly against which the piston is subject thereby reducing the exhaust pressure losses. Indeed in the extreme the pressure and back pressure may be reduced to a sub-atmospheric pressure in the second exhaust duct 20 and thereby even drive the piston during this exhaust stroke. In addition the compressor 32 by sucking the exhaust from the cylinder 12 better scavenges the exhaust gases from the cylinder 12. This increases the knock limit and allows higher pressure and temperature combustion improving efficiency of the engine operation. In addition lowering of the back pressure will also lower the pressure within the cylinder 12 at the end of the exhaust stroke, and beginning of the next intake/induction stroke. As a result the induction and inlet flow of gas into the cylinder 12 may also be improved and the arrangement may have a beneficial effect upon inlet pumping losses and drawing amendment of gas into the cylinder 12.

While the turbine 28 during the second exhaust phase is not being driven by a flow of exhaust gas through first exhaust duct 18, it will however continue to spin and rotate due to its own inertia and the inertia of the drive shaft 30 and compressor 32. In addition in a multi-cylinder engine 10 with a common exhaust manifold the turbine 28 will be supplied with an initial exhaust flow from a subsequent working cylinder so as to continue to provide drive to the compressor 32.

The outlet 40 of the turbine 28 is also preferably connected to the second duct 20 and therefore compressor 32 such that additionally the compressor 32 will also draw and suck exhaust through the turbine 38. This increases the pressure drop across the turbine 28 and so power extracted without increasing losses and inefficiencies. In addition it will also, during the second exhaust phase, continue a residual flow of exhaust gas through the turbine 28.

With careful tuning of the various exhaust ducts 18 and 20 as is known in the art these restrictive flows and pressure drops can be optimized to ensure optimal operation and ensure the pumping losses are minimized.

A heat exchanger or cooler 36 may also preferably be interposed upstream of the inlet 34 to the compressor 32 and connected to the second exhaust duct to cool the exhaust gases from the second exhaust duct. This heat exchanger 36 lowers the temperature of the exhaust flow from the second duct 20, improving the performance of the compressor 32 and thereby further reduces the back pressure in the second exhaust duct 20, yet further reducing the exhaust pumping losses. The heat exchanger 36 may be cooled and the heat extracted from the exhaust flow by the main engine 10 coolant system (not shown). Alternatively, and more preferably the heat extracted from the exhaust flow by the heat exchanger 36 may be used in other known energy recovery systems to provide further energy thereby further improving the energy efficiency of the engine 10. The heat exchanger 36 will also lower the overall exhaust temperature delivered to the inlet 34 of the compressor 32 so reducing the thermal specification of the compressor 32, reducing cost and improving reliability as well as improving the overall performance 32.

With this exhaust system arrangement 16 the overall exhaust system pressure and so pumping losses are reduced by the compressor 32, with the compressor advantageously being driven by waste work extracted from the exhaust by the turbine 28, whilst by use of the split first and second exhaust duct 18, 20 no additional pumping losses or losses associated with having such a turbine 28 are incurred. In other words this exhaust system 16 manages to extract useful work from the exhaust by use of a turbine 28 and without increasing the exhaust system back pressure during the exhaust stroke, while in addition using this extracted work to then, by use of the compressor lower the exhaust back pressure and therefore indeed lower the pumping losses. As a result, in modeling this arrangement has been found to give fuel consumption reductions of more than 2.5% and with optimization of the compressor and turbine characteristics and valve timings it is anticipated to give a fuel benefit of over 4% over a large amount of the engine speed range.

Figure 3:
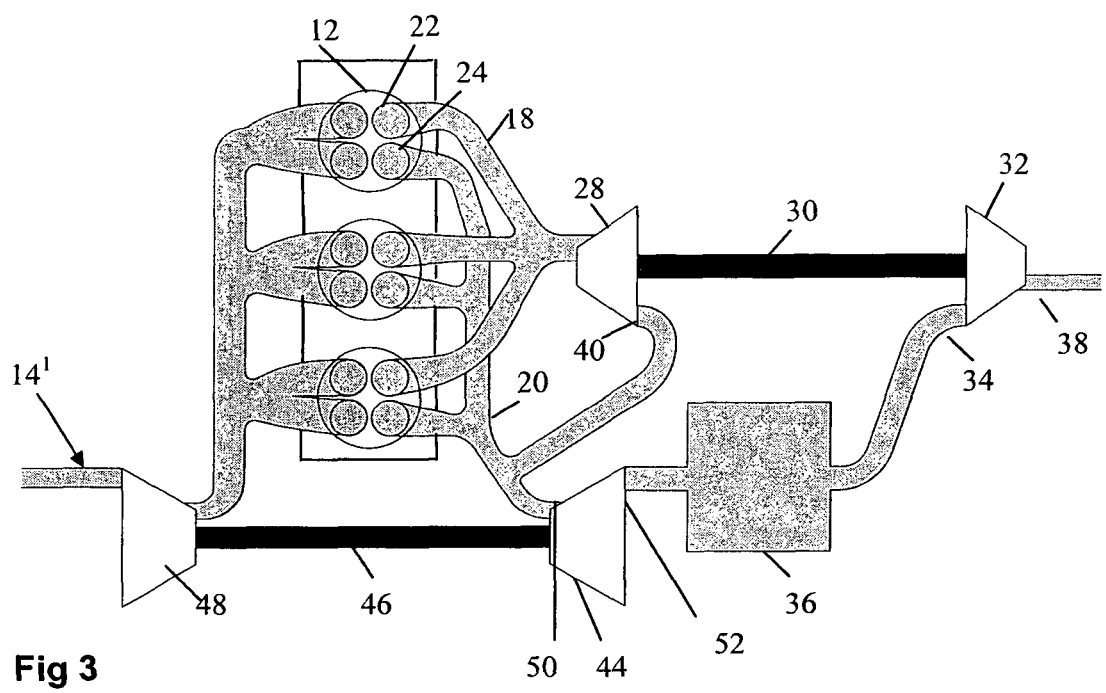
FIG. 3 is a schematic illustration of an exhaust and inlet system applied to a three cylinder internal combustion engine, similar to FIG. 1, but in accordance with an alternative embodiment of the invention.

FIG. 3 shows a second embodiment, and a combined system in which the exhaust system arrangement 16 of FIG. 1 has been combined with a conventional type turbocharging arrangement. This is achieved by incorporating a second turbine 44 drivingly connected by the drive shaft 46 to an inlet compressor 48 which compresses the inlet flow into the cylinders 12 of the internal combustion engine in a conventional manner. This embodiment is generally similar to the embodiment shown in FIG. 1 and like reference numerals are used for corresponding elements.

In this alternative arrangement the second turbine 44 is placed in the second exhaust duct 20 upstream of the compressor 32, and optional heat exchange 36, but down steam of the outlet 40 from the first turbine 28. The inlet 50 to the second turbine 44 connects to the second duct 20, and also preferably as shown to the outlet 40 of the first turbine 28 to received exhaust flow from that turbine 28 as well and from the second duct 20 as a whole. The outlet 52 of the second turbine 44 is then connected to the inlet 34 of the exhaust compressor 32, in this case via the heat exchanger 36. The initial blowdown flow in the first exhaust phase having passed through the first turbine 28 is therefore also directed through the second turbine 44 to further extract any energy from it and with the main exhaust flow through the second exhaust duct 20 also flowing through the second turbine 44. While in this arrangement the second turbine 44 will increase the back pressure in the second duct 20, and acting on the piston during the second exhaust phase and main exhaust stroke, this is offset by the lowering of the back pressure in the exhaust system 16 as a whole provided by the compressor 32. In particular the compressor 32 lowers the outlet pressure of the turbine 44 and accordingly for a given amount of energy extracted the corresponding inlet pressure, and therefore the pressure seen in second duct 20. In addition the reduction in inlet pumping losses provided by the inlet compressor 48, and overall improvement provided by boosting the inlet further offset any increase in back pressure and inlet pumping losses.

The second turbine 44 of this embodiment could be replaced in other configurations and indeed a yet further bypass duct and bypass arrangement provided around the second turbine 44 if back pressures provided by the second turbine 44 are significant. Indeed in a yet further alternative embodiment the first turbine 28 could perhaps drive the inlet pressure 48 by drive shaft 46 connected to the first turbine 28 and the second turbine 44 emitted in its entirety. This would however require resizing of the turbine 28, and while this would reduce the number of components it may be thermodynamically better and easier to provide two separate turbines optimized for the particular different operating conditions and requirements.

This arrangement has similar predicted improvements in fuel economy and over conventionally turbocharged engines to that provided by the earlier embodiments over comparable normally aspirated engines.

It is appreciated that there may be many other modifications and variations on the particular embodiment described. For example the outlet 40 of the turbine 28 may be directly vented to atmosphere, although in such arrangement the benefits are reduced. Other changes in the details arrangement will also be apparent to those skilled in the art. It will also be appreciated that the invention is applicable to a wide range of current and future turbine combustion engines as well as in combination with other energy technology for example variable valve time and exhaust gas recirculation and use of intake throttle turbines. The invention can also be applied to all types of internal combustion engine 10, and for a wide range of applications including automotive vehicle application as well as static power generation.

The principle and mode of operation of this invention have been explained and illustrated in its preferred embodiment. However, it must be understood that this invention may be practiced otherwise than as specifically explained and illustrated without departing from its spirit or scope.

The invention claimed is:

1. An exhaust arrangement (16) for an internal combustion engine (10) comprising:
   a first exhaust duct (18) for an exhaust flow from the engine (10);
   a second exhaust duct (20) for an exhaust flow from the engine (10);
   a valve arrangement (22,24) configured to selectively direct exhaust from the engine during an exhaust stroke to the first exhaust duct (18) during a first phase of the exhaust stroke, and to the second exhaust duct (20) during a subsequent second phase of the exhaust stroke;
   a turbine (28) having an inlet (26) connected to the first exhaust duct (18) and an outlet (40); and
   a compressor (32) drivingly connected to and driven by the turbine (28), and having an inlet (34) connected to the second duct (20) and an outlet (38).

2. The exhaust arrangement (16) as claimed in claim 1, wherein the turbine (28) has an outlet (40) connected to at least one of the second exhaust duct (20) and the compressor inlet (34).

3. The exhaust arrangement (16) as claimed in claim 1 wherein the valve arrangement (22,24) selectively directs exhaust from the engine (JO) to both the second and first exhaust ducts (18,20) during the second phase of the exhaust stroke.

4. The exhaust arrangement (16) as claimed in claim 1 wherein the valve arrangement (22,24) selectively directs exhaust from the engine (10) to only the first exhaust duct (18) during the first phase of the exhaust stroke, and to only the second exhaust duct (20) during the subsequent second phase of the exhaust stroke.

5. The exhaust arrangement (16) as claimed in claim 1 wherein the valve arrangement (22,24) comprises separate first (22) and second (24) exhaust valves.

6. The exhaust arrangement (16) as claimed in claim 5 comprising separate first and second exhaust valves (22,24) associated with each cylinder (12) of the internal combustion engine (10).

7. The exhaust arrangement (16) as claimed in claim 1 further comprising a heat exchanger or cooler (36) connected to at least the second exhaust duct (20) for cooling the exhaust gases flowing through the second exhaust duct (20).

8. The exhaust arrangement (16) as claimed in claim 7 wherein an outlet of the heat exchanger or cooler (36) is connected to the inlet (34) of the compressor (32).

9. The exhaust arrangement (16) as claimed in claim 1 the internal combustion engine (10) having at least one reciprocating piston.

10. The exhaust arrangement (16) as claimed in claim 9 wherein the first phase of the exhaust stroke corresponds to a period when the piston is around bottom dead center.

11. The exhaust arrangement (16) as claimed in claim 9 wherein the second phase of the exhaust stroke corresponds to a period when the piston is moving during an exhaust stroke.

12. The exhaust arrangement (16) as claimed in claim 1 further comprising a second turbine (44) for driving an inlet compressor (38) for compressing an inlet flow into the engine (10), the second turbine (44) having an inlet connected to the second exhaust duct (20) and an outlet (52) connected to the compressor inlet (34).

13. An internal combustion engine (10) including an exhaust arrangement (16), said exhaust arrangement (16) including:
    a first exhaust duct (18) for an exhaust flow from the engine (10);
    a second exhaust duct (20) for an exhaust flow from the engine (10);
    a valve arrangement (22,24) configured to selectively direct exhaust from the engine during an exhaust stroke to the first exhaust duct (18) during a first phase of the exhaust stroke, and to the second exhaust duct (20) during a subsequent second phase of the exhaust stroke;
    a turbine (28) having an inlet (26) connected to the first exhaust duct (18), and an outlet (40); and
    a compressor (32) drivingly connected to and driven by the turbine (28), and having an inlet (34) connected to the second duct (20), and an outlet (38).

14. The internal combustion engine (10) as claimed in claim 13 further comprising an inlet compressor (48) for compressing an inlet flow into the engine (10).

15. The internal combustion engine (10) as claimed in claim 14 in which the inlet compressor (48) is drivingly connected to and driven by the turbine (28).

16. The internal combustion engine (10) as claimed in claim 14 wherein the exhaust arrangement (16) further comprises a second turbine (44) having an inlet (50) connected to the second exhaust duct (20) and an outlet (52) connected to the compressor inlet (34), and drivingly connected to the inlet compressor (48) of the engine (10).

* * * * *